(12) United States Patent
Murayama et al.

(10) Patent No.: US 10,091,489 B2
(45) Date of Patent: Oct. 2, 2018

(54) IMAGE CAPTURING DEVICE, IMAGE PROCESSING METHOD, AND RECORDING MEDIUM

(71) Applicant: Sharp Kabushiki Kaisha, Osaka-shi, Osaka (JP)

(72) Inventors: Daisuke Murayama, Osaka (JP); Kenichi Iwauchi, Osaka (JP); Kei Tokui, Osaka (JP); Yasutaka Wakabayashi, Osaka (JP); Shinichi Arita, Osaka (JP); Nao Shibuhisa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 179 days.

(21) Appl. No.: 14/387,952

(22) PCT Filed: Mar. 13, 2013

(86) PCT No.: PCT/JP2013/057013
§ 371 (c)(1),
(2) Date: Sep. 25, 2014

(87) PCT Pub. No.: WO2013/146269
PCT Pub. Date: Oct. 3, 2013

(65) Prior Publication Data
US 2015/0062305 A1    Mar. 5, 2015

(30) Foreign Application Priority Data

Mar. 29, 2012  (JP) ................................. 2012-077677
Apr. 4, 2012   (JP) ................................. 2012-085773

(51) Int. Cl.
*H04N 15/00*    (2006.01)
*H04N 13/02*    (2006.01)
(Continued)

(52) U.S. Cl.
CPC ......... *H04N 13/243* (2018.05); *G01B 11/022* (2013.01); *G01B 11/043* (2013.01);
(Continued)

(58) Field of Classification Search
CPC ......................... H04N 13/0242; G01B 11/022
(Continued)

(56) References Cited

U.S. PATENT DOCUMENTS 5,963,664 A * 10/1999 Kumar ..................... G06K 9/32
                                                348/47
2011/0249117 A1* 10/2011 Yoshihama ........... G06T 7/0075
                                                348/135

FOREIGN PATENT DOCUMENTS

JP       8-201025 A     8/1996
JP    2009-258273 A    11/2009
(Continued)

*Primary Examiner* — Gims Philippe
*Assistant Examiner* — Amir Shahnami
(74) *Attorney, Agent, or Firm* — Keating & Bennett, LLP

(57) ABSTRACT

An image capturing device includes at least two image sensors and an image processing unit that performs image processing on image information that is captured by image sensors and an image display unit that displays the image information on which the image processing is performed by the image processing unit. The image processing unit displays two base points on the image display unit in a same direction as a direction in which the two image sensors are arranged, calculates a disparity value between a first base point and a second base point that are the two base points with the two image sensors, calculates a length between the first base point and the second base point, and displays a result of calculation of the length between the first base point and the second base point on the image display unit. The image capturing device realizes distance measurement which allows a user to know a length of an object in real time
(Continued)

by a simple operation, is easy to use, and satisfies the user and enables an accuracy improvement of a calculated length.

20 Claims, 16 Drawing Sheets

(51) Int. Cl.
*H04N 13/243* (2018.01)
*G01B 11/04* (2006.01)
*G01B 11/02* (2006.01)
*G06T 7/62* (2017.01)
*H04N 13/239* (2018.01)

(52) U.S. Cl.
CPC ...... *G06T 7/62* (2017.01); *G06T 2207/10012* (2013.01); *H04N 13/239* (2018.05)

(58) Field of Classification Search
USPC .......................................................... 348/48
See application file for complete search history.

(56) References Cited

FOREIGN PATENT DOCUMENTS

| | | |
|---|---|---|
| JP | 2011-153995 A | 8/2011 |
| JP | 2011-232330 A | 11/2011 |

* cited by examiner (A)

(B)

(A) REAR VIEW OF LENGTH MEASUREMENT DEVICE
(EXAMPLE OF STEREO CAMERA ARRANGEMENT)

(B) FRONT VIEW OF LENGTH MEASUREMENT DEVICE
(EXAMPLE OF SCREEN DISPLAY)

(A)

(B)

(C)

(A) MEASUREMENT ENVIRONMENT (B) RELATIONSHIP BETWEEN CAPTURED IMAGE AND DISTANCE (A) MEASUREMENT ENVIRONMENT (B) RELATIONSHIP BETWEEN CAPTURED IMAGE AND DISTANCE

IMAGE CAPTURING DEVICE, IMAGE PROCESSING METHOD, AND RECORDING MEDIUM

TECHNICAL FIELD

The present invention relates to a device that uses image information that is captured by image-capturing units to measure a length of an object, and relates to a technique related to an image capturing device, particularly to a technique that calculates the distance between two points in a captured image. This application claims priority from Japanese Patent Application No. 2012-077677 filed on Mar. 29, 2012 and Japanese Patent Application No. 2012-085773 filed on Apr. 4, 2012, the disclosure of which is incorporated herein by reference.

BACKGROUND ART

An image capturing device (stereo camera) that includes two image sensors capable of capturing a stereoscopic image has been developed. When a stereoscopic image is captured, the image for the left eye is captured by the image sensor for the left eye, and the image for the right eye is captured by the image sensor for the right eye. Disparity, of which degree changes in accordance with the distance from the image capturing device to an object, occurs between the captured left and right images. The relationship between disparity and distance may be expressed by $D=B \times f/Z$. Here, D denotes disparity, B denotes a baseline length, f denotes a focal length, and Z denotes the distance from the image capturing device to the object. In a case where an image is captured by two image sensors that are arranged in parallel, the disparity becomes large when the distance from the image capturing device to the object is short, becomes small when the distance is long, and becomes zero for an infinite distance.

A method has been developed that calculates distance information based on such a disparity occurred in the left and right images in order to calculate a length between two points in a captured image, and an example is a method that is disclosed by PTL 1 described below. As illustrated in FIG. 26, in PTL 1, two points Ps and Pe, that is, a measurement start position and a measurement end position, respectively, are specified (T1 and T2) in an image that is captured by the image capturing device, and the length between the two points Ps and Pe is calculated using three-dimensional positional data.

Further, in a technique disclosed by PTL 2, two optical systems both installed in a distal end of an endoscope device are used to obtain two images that have disparity. A user moves a cursor on a monitor and specifies a first point and then moves the cursor on the images. The length between the position of the specified first point and the position of a present cursor is measured. A continuously updated value is displayed, and a position and a length of the object are measured at all times.

These image capturing devices are also referred to as length measurement devices in a case where a main purpose is measurement of a length.

CITATION LIST

Patent Literature

PTL 1: Japanese Unexamined Patent Application Publication No. 2011-232330

PTL 2: Japanese Unexamined Patent Application Publication No. 2009-258273

SUMMARY OF INVENTION

Technical Problem

However, in the method disclosed in PTL 1, a user has to operate a touch panel of a monitor or specify two points by moving a cursor. Thus, when changing measurement portions, the user has to newly specify two points each time. Further, in a case where the monitor displaying the captured images is small, the user has difficulty in specifying a small point because the object is displayed small.

Further, in the method of PTL 1, the positions of the measurement start position Ps and the measurement end point Pe are specified by touch inputs (T1 and T2) on a touch panel screen or by operating a pointer on the screen with a directional pad. However, inputs on the touch panel does not allow accurate specification because the measurement positions are covered by a finger of the user when measurement points are specified, resulting a calculated distance that is different from the one expected by the user. Further, the operation by the directional pad needs a fine operation in order to realize accurate specification that is intended by the user. The number of input operations by the directional pad increases, thus resulting in inconvenience in use. In addition, the distance may not be known until the two positions of the measurement start position and the measurement end position are specified, and whether or not calculation of the length between desired two points is satisfactorily achieved may not be known.

The method of the above PTL 2 facilitates measurement work of the user because an effort of the user to specify a second point is reduced and a present measurement value may always be checked. However, there is a problem that the reduction in the effort of the user is not sufficient because there is work of specifying at least one point.

The present invention has been made for solving the above described problems and provides an image capturing device that realizes distance measurement, which allows a user to satisfactorily know a length of an object in real time by a simple and easy operation, and enables improvement in accuracy of a calculation of the length.

Solution to Problem

An image capturing device of the present invention is an image capturing device including: at least two image sensors; an image processing unit that performs image processing on image information that is captured by the image sensors; and an image display unit that displays the image information on which the image processing is performed by the image processing unit, in which the image processing unit displays two base points on the image display unit in a same direction as a direction in which the two image sensors are arranged, calculates a disparity value between a first base point and a second base point that are the two base points with the two image sensors, calculates a length between the first base point and the second base point, and displays a result of calculation of the length between the first base point and the second base point on the image display unit.

Further, in the image capturing device of the present invention, coordinate positions of the two base points are preferably corrected based on positional dependence of distance information that corresponds to the image information, and a length between the corrected two base points is preferably calculated.

Further, in the image capturing device of the present invention, feature point is preferably detected from the image information, and the coordinate position is preferably adjusted such that at least one of the two base points is set to the feature point.

Further, in the image capturing device of the present invention, a display format of at least one of the two base points is preferably changed in accordance with the distance information.

Further, the present invention is an image processing method that uses an image capturing device that includes at least two image sensors, an image processing unit that performs image processing on image information that is captured by the image sensors, and an image display unit that displays the image information on which the image processing is performed by the image processing unit, in which the image processing unit has:
  a step of displaying two base points on the image display unit in a same direction as a direction in which the two image sensors are arranged;
  a step of calculating a disparity value between a first base point and a second base point that are the two base points with the two image sensors;
  a step of calculating a length between the first base point and the second base point; and
  a step of displaying a result of calculation of the length between the first base point and the second base point on the image display unit.

Further, the present invention may be a program that executes the image processing method.

Advantageous Effects of Invention

The image capturing device of the present invention allows a user to know a length of an object in real time by a simple operation with a little effort by the user.

Further, the image capturing device of the present invention allows a user to easily perform highly accurate measurement and calculation of a length while capturing an object with base points that are used to measure the length between two points in the object.

DESCRIPTION OF EMBODIMENTS

First Embodiment

Embodiments of the present invention will hereinafter be described in detail with reference to drawings.

Figure 1:
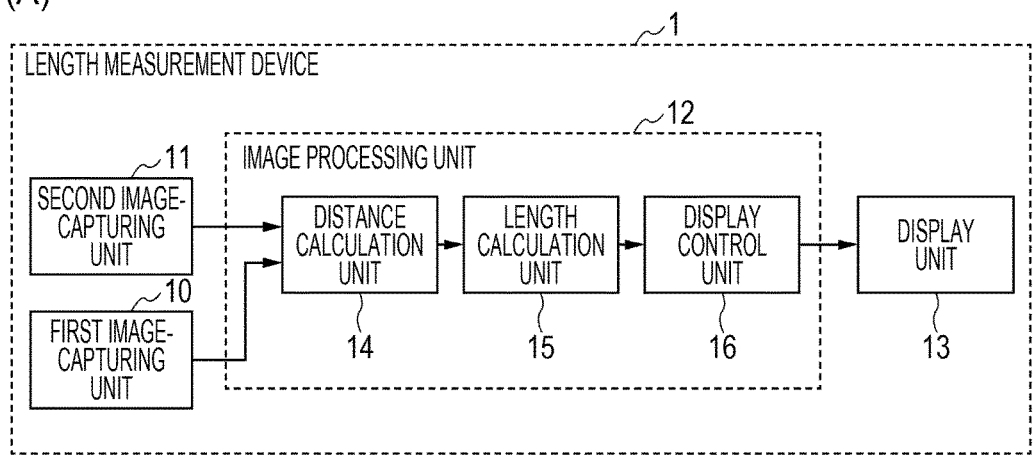
FIG. 1(A) is a block diagram that illustrates a configuration example of a length measurement device in first and second embodiments of the present invention.
FIG. 1(B) is a function block diagram that illustrates a configuration example of a length calculation unit.
Figure 1:
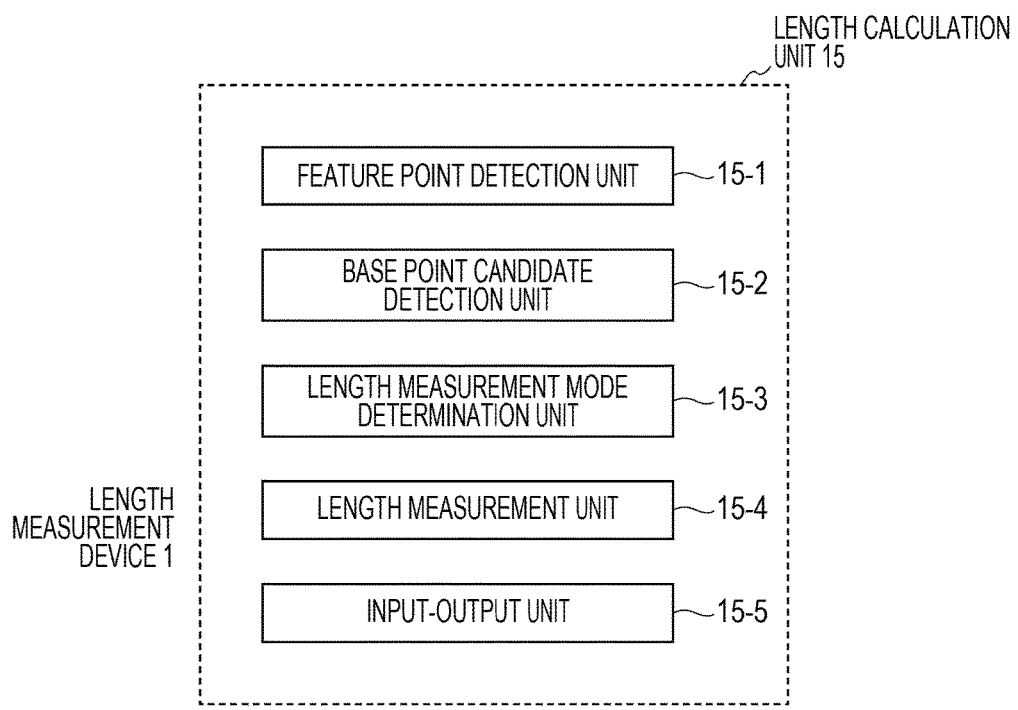

FIG. 1(A) is a function block diagram that illustrates an example of a hardware configuration of a length measurement device according to this embodiment. A length measurement device 1 according to a first embodiment includes a first image-capturing unit 10 and a second image-capturing unit 11 that capture images of an object, that is, a measurement target, an image processing unit 12 that performs image processing based on output images of the first and second image-capturing units 10 and 11, and a display unit 13 that displays output information of the image processing unit 12.

Further, the image processing unit 12 includes a distance calculation unit 14 that calculates the distance information from the first and second image-capturing units 10 and 11 to the object, a length calculation unit 15 that calculates the length of the object, and a display control unit 16 that controls display information.

The length measurement device in this embodiment includes a processor such as a central processing unit (CPU) and a main storage device such as a random access memory (RAM), for example, and may realize processes of above processing units by executing a program that is stored in the storage device. Alternatively, the length measurement device includes a programmable integrated circuit such as a field programmable gate array (FPGA) or an integrated circuit that is dedicated to the above processes, and the above processes may thereby be realized by hardware.

The first image-capturing unit 10 and the second image-capturing unit 11 capture images of the object and output the images and include image sensors, which convert received light into electric signals to form images, such as charge coupled devices (CCD) and complementary metal oxide semiconductors (CMOS), and optical systems such as lenses for gathering light from the object to the image sensors.

Further, the display unit 13 is a display that has pixels of a liquid crystal element or an organic electro luminescence (EL) material, for example.

Next, an example of use of the length measurement device 1 will be described with reference to FIGS. 2 and 3.

Figure 2:
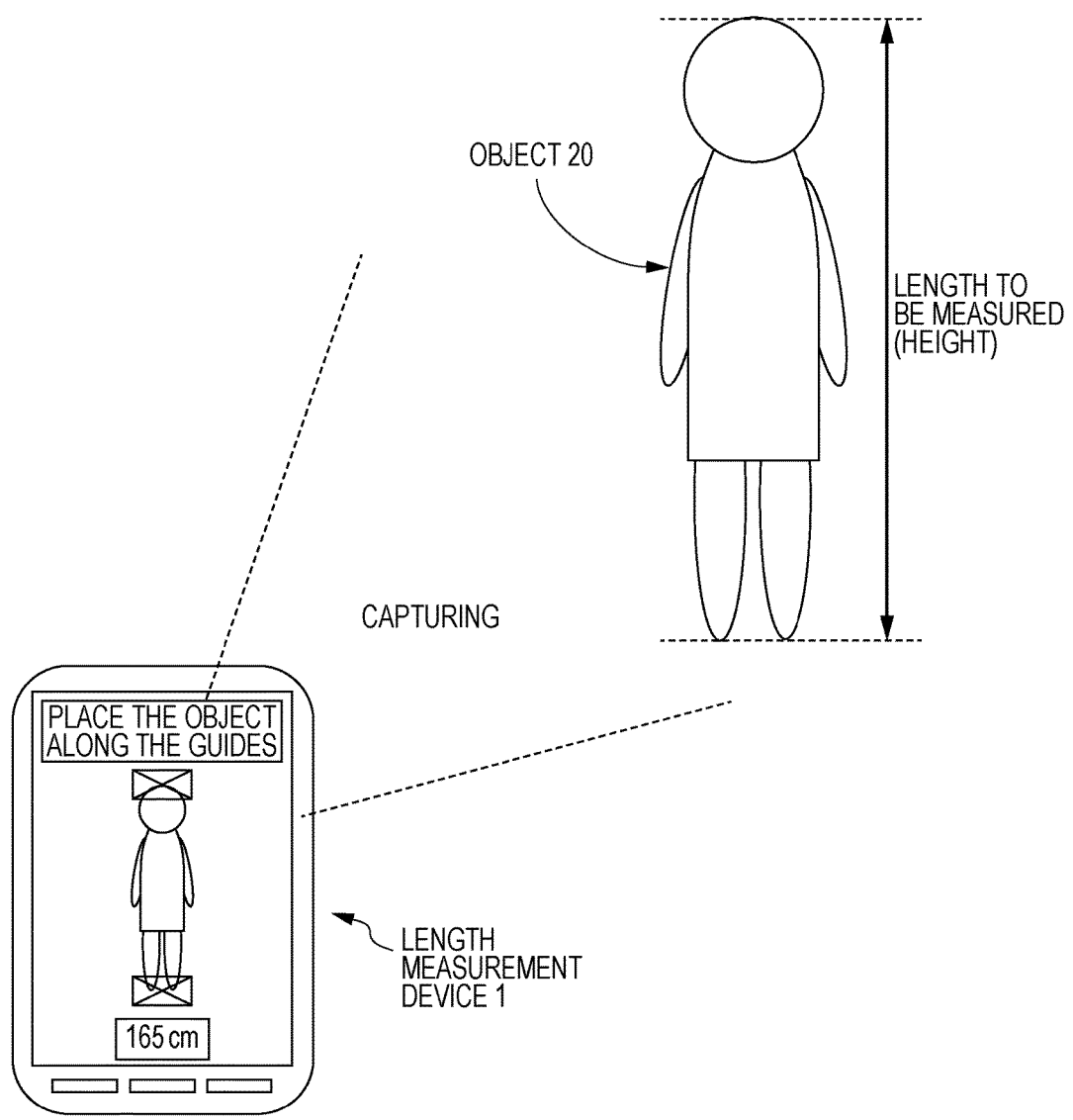
FIG. 2 illustrates an example of a use environment of the length measurement device according to the embodiments.
Figure 3:
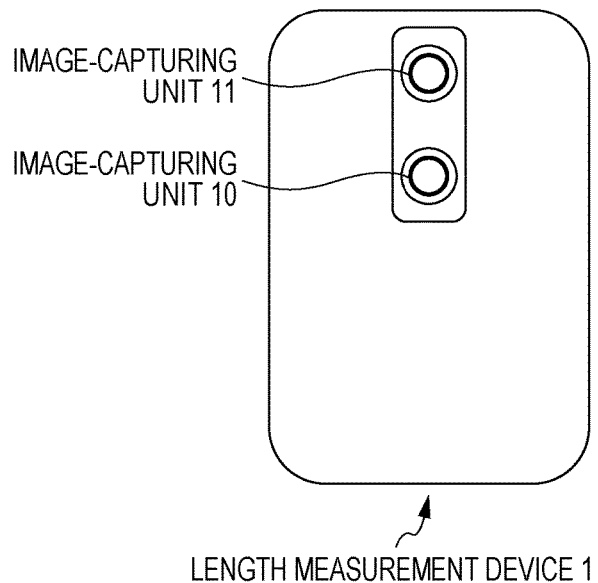
FIG. 3 is an external configuration diagram that illustrates a configuration example in a case where the length measurement device according to the embodiments is realized by an information terminal.
Figure 3:
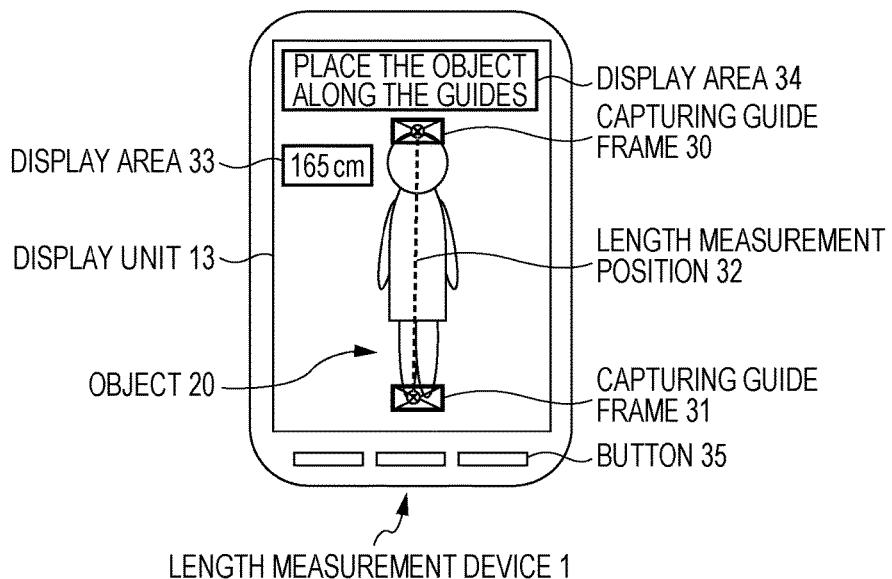

FIG. 2 illustrates an example of use where the length measurement device according to the present invention is realized by an information terminal such as a cellular phone or a smart phone and illustrates a state where an image of an object 20 is captured by the length measurement device 1 from a front side and the length of the object 20, for example here, the height of a person is measured. Further, FIG. 3 schematically illustrates an external configuration of the length measurement device 1 that is illustrated in FIG. 2. In FIGS. 2 and 3, the same reference numerals are provided to units in the same configuration as the block diagram of FIG. 1.

FIG. 3(A) illustrates a rear view of the length measurement device 1, in which two image-capturing units of the first and second image-capturing units 10 and 11 are installed in stereo arrangement. The stereo arrangement means that the optical axes of the two image-capturing units are substantially in parallel. In this embodiment, units in the same configuration are used for the two image-capturing units 10 and 11 as an example. However, image-capturing units in configurations that are different in resolution, angle of view, and so forth may be used as long as images of a same area may be captured by two image-capturing units and correspondence between pixels may be obtained.

Further, FIG. 3(A) illustrates a case where the two image-capturing units are vertically aligned in the perpendicular direction. However, those may laterally be aligned in the horizontal direction, and the illustrated image capturing device may be used while being inclined in a lateral direction.

FIG. 3(B) illustrates a front view of the length measurement device 1, in which a picture taken by the image-capturing units 10 and 11 are displayed as a live view on the display unit 13 that is a liquid crystal display, for example. In FIG. 3(B), an image of the object 20 captured by the image-capturing units is displayed. In this embodiment, the first image-capturing unit 10 is used as a base unit and a picture captured thereby is displayed on the display unit 13. However, either one of the first image-capturing unit 10 and the second image-capturing unit 11 may be used as a base unit.

The display unit 13 displays an image in which a capturing guide frame 30 and a capturing guide frame 31 are superposed on the image captured by the first image-capturing unit 10. The capturing guide frames 30 and 31 are preferably set in advance and stored in a storage device that is not illustrated herein. Further, the capturing guide frames 30 and 31 are always displayed at the same coordinates on a screen of the display unit 13. That is, the positions of the capturing guide frames 30 and 31 do not change even in a case where the object or the length measurement device moves. In FIG. 3(B), setting is made such that the capturing guide frames 30 and 31 having rectangular shapes are arranged in the perpendicular direction. However, a shape and an arrangement method of the capturing guide frame are not limited to this.

Figure 4:
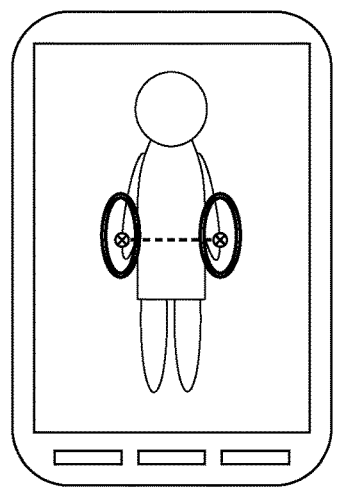
FIG. 4 illustrates a setting example of capturing guides.
Figure 4:
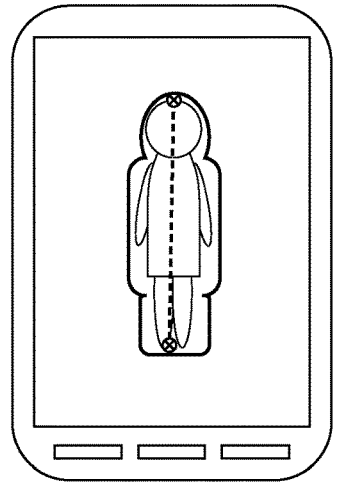
Figure 4:
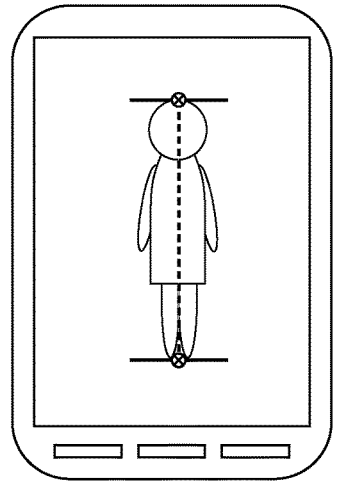

For example, elliptical frames may be arranged in the horizontal direction as FIG. 4(A). The frame may be set as person-shaped silhouettes as FIG. 4(B) or as upper and lower lines as FIG. 4(C). The frame may be formed in any shape. Those settings may be made in advance. A user may form the frame into a shape including a circle, a rectangle, and a line segment that are prepared by a graphical user interface (GUI) when the length measurement device is started.

The length measurement device 1 selects two base points such as an upper end and a lower end of the object among from feature points in the capturing guide frames (a base point detection method will be described later in detail), calculates three-dimensional positions of the base points, and calculates the length of a line segment that connects the base points, thereby performing length measurement. Because the positions of the capturing guide frames are fixed, the user may move the length measurement device 1 while monitoring the picture of the display unit 13 and moves such that the object is placed between the capturing guide frames. If an enlarged image of a peripheral area around the capturing guide frame is displayed at a portion of the display unit 13, an improvement in operability in position matching by the user may thereby be expected. Further, the length between the above detected base points is always calculated, and a display on a display area 33 is always updated. At the same time, a length measurement position 32 is displayed on the display unit 13, thereby allowing the user to check a length measurement position and a length measurement result while performing measurement. Both ends of the length measurement position 32 are the two base points, and the base points are displayed, thereby allowing the user to always check a measurement position. An instruction about an operation method for the user may be given on a display area 34. Further, an instruction may be given not only by a written message but also by a sound guidance or the like.

Further, the length measurement device 1 includes a storage device such as a flash memory or an external storage device such as a memory card, thereby allowing a captured picture to be saved as a still image and data of the length measurement results to be saved as a text data or saved in a state where the data are superposed on a still image. This process may be realized by a configuration in which information is written in the storage device when the length measurement device 1 determines that a user pressed a hardware button 35, for example. Further, a picture that is being displayed as a live view on the display unit 13 is paused by pressing the button, and the length measurement result that is always displayed on the display area 33 while updating its data is fixed, thereby allowing the user to check the present length measurement position and result. Further, an operation method is not limited to the hardware button. For example, the display unit 13 is formed using a common touch panel such as a resistive film type touch panel or a capacitive type touch panel. Accordingly, an operation is realized by touching a button-image, the captured object or the like, displayed on the screen.

Next, a process of a length measurement method will be described in detail with reference to the drawings.

Figure 5:
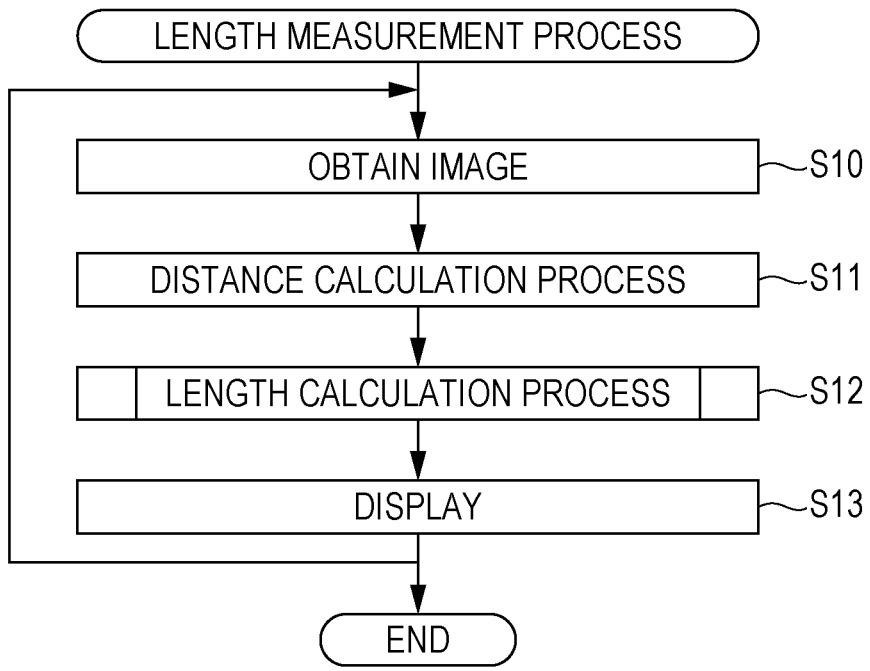
FIG. 5 is a flowchart that illustrates a flow of a length measurement process.

FIG. 5 is a flowchart that illustrates a flow of a length measurement process of the length measurement device 1 in this embodiment. First, images of the object are captured by the first and second image-capturing units 10 and 11 to obtain two images (step S10). Next, the distance calculation unit 14 calculates distance information from the two images that are obtained in step S10 (step S11). Then, the length calculation unit 15 detects length measurement base points of the object from the image of the image-capturing unit 10 that serves as the base and calculates the distance between the base points, thereby calculating the length of the object (step S12). Finally, the display control unit 16 outputs an image in which the capturing guide frames and the length measurement positions are superposed on the image of the image-capturing unit 10 that serves as the base and the length measurement result to the display unit 13 (step S13).

In step S11, the distance calculation unit 14 performs distance calculation by a stereo method from the two images that are obtained in step S10. In the stereo method, images of almost the same areas are captured by two image-capturing units that are arranged substantially in parallel, the disparity between corresponding pixels in two obtained images is obtained, and the distance is calculated based on the disparity. In the stereo method, obtainment of corresponding pixels between two images is referred to as stereo matching. For example, the following process is performed.

For a certain pixel of one of the images, the other image is scanned in the horizontal direction, and pixel matching is thereby performed. The pixel matching is performed for a block that has a target pixel at a center. A sum of absolute difference (SAD) that provides the sum of absolute difference of the pixels in the block is calculated, the block whose SAD value is the smallest is determined, and the pixel in the other image that corresponds to the target pixel in the one image is thereby obtained. Calculation methods such as sum of squared difference (SSD), graph cut, and dynamic programming (DP) matching are used other than the calculation method by the SAD. When the corresponding pixel is obtained, the disparity value of the pixel is known. The disparity value may be calculated in a case where the two image-capturing units are arranged not in the left-right direction but in the up-down direction. In such a case, the captured image may be scanned in the perpendicular direction instead of the horizontal direction.

A distance value is calculated from the obtained disparity value by equation (1) based on the principle of triangulation. Here, Z denotes a distance value, f denotes a focal length of the image-capturing units, b denotes a baseline length between the two image-capturing units, and d denotes the disparity value.

[Equation 1]

$$Z = \frac{f \times b}{d} \quad (1)$$

The distance calculation described above may be performed for the entire images or for peripheral positions of the capturing guide frames. The distance information is used in a length calculation process that will be described later. Thus, it is sufficient that the distance information about an area that is needed in length calculation is obtained.

FIG. 1(B) is a function block diagram that illustrates a configuration example of the length calculation unit 15. The length calculation unit 15 has a feature point detection unit 15-1, a base point candidate detection unit 15-2, a length measurement mode determination unit 15-3, a length measurement unit 15-4, and an input-output unit 15-5.

Figure 6:
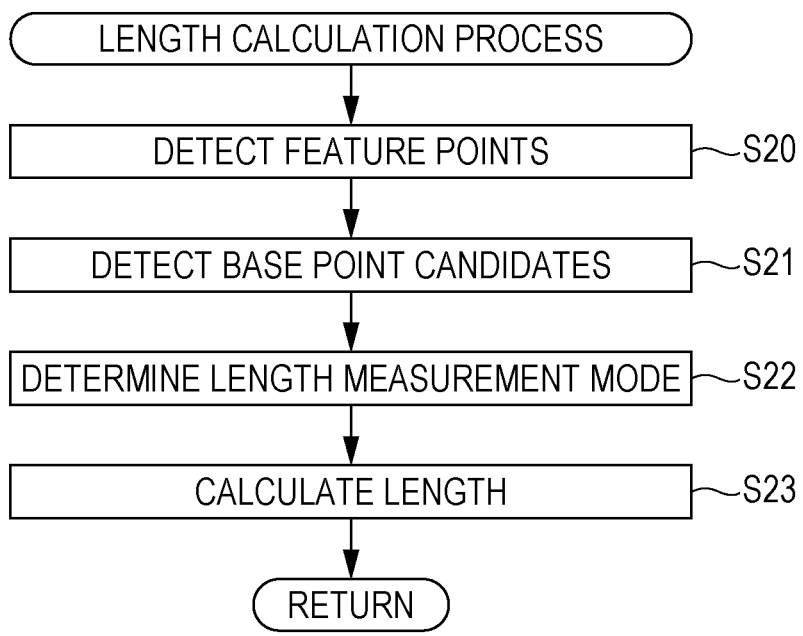
FIG. 6 is a flowchart that illustrates a flow of a length calculation process.

In step S12, the length calculation unit 15 performs length calculation based on a length calculation process flowchart that is illustrated in FIG. 6.

First, the feature point detection unit 15-1 detects feature points from the image obtained by the image-capturing unit 10 (step S20). A detection range may be the entire image or may be limited to areas in the capturing guide frames or peripheries of capturing guides. Feature point detection may be performed by a common feature point detection method such as Harris corner detection method. The feature point detection method is not limited to this, but any method may be used as long as feature points of the object may be detected from an image.

Next, the base point candidate detection unit 15-2 detects base point candidates in positions where the length measurement is performed from the detected feature points (step S21). In a case of FIG. 3(B), it may be assumed that the user places end points of the object in central positions of the capturing guide frames 30 and 31, and the feature points that are closest to the central positions of the capturing guide frames are made the base point candidates.

In the above, a description is made about a method of displaying the capturing guides on the display unit and detecting the base point candidates from the feature points in the capturing guide frames. However, the display unit is formed as a touch panel, and points that are directly specified by the user with his/her finger may be made the base point candidates. Alternatively, the base point candidates may be specified by moving a cursor by a key operation.

Next, the length measurement mode determination unit 15-3 makes a determination about the measurement target. That is, a determination is made whether the length measurement mode is a body length measurement mode that measures the length or the width of a single body or an interval length measurement mode that measures an interval between two bodies (step S22).

Figure 7:
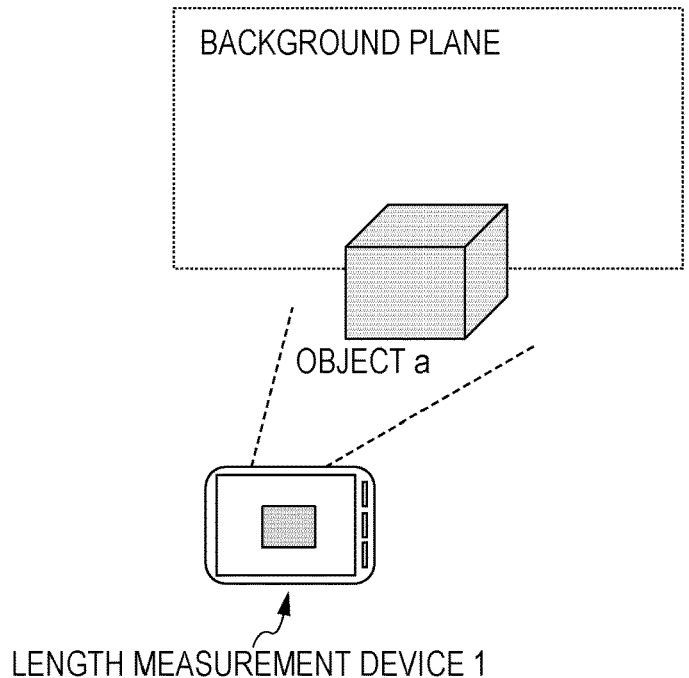
FIG. 7 illustrates an example of length measurement environment of a body length measurement mode and the relationship between a captured image and a distance.
Figure 7:
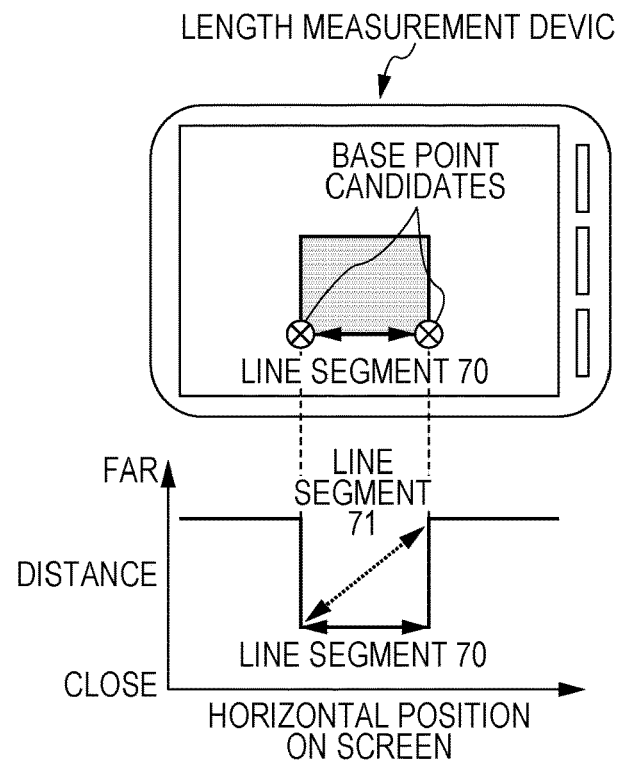
Figure 8:
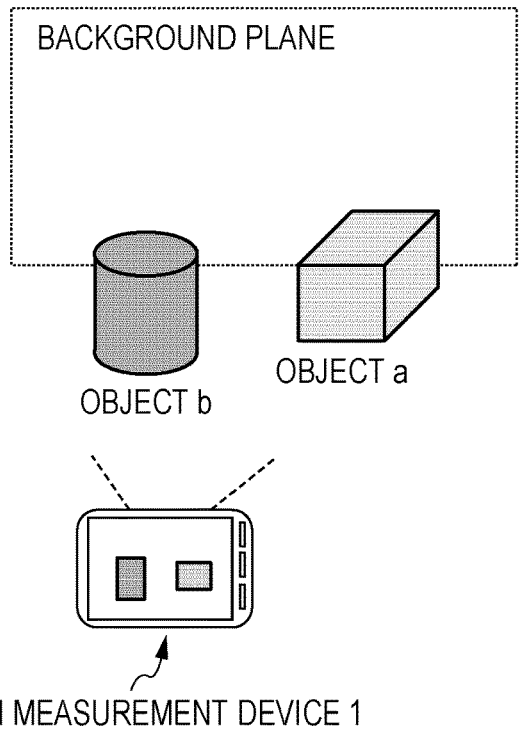
FIG. 8 illustrates an example of length measurement environment of an interval length measurement mode and the relationship between a captured image and a distance.
Figure 8:
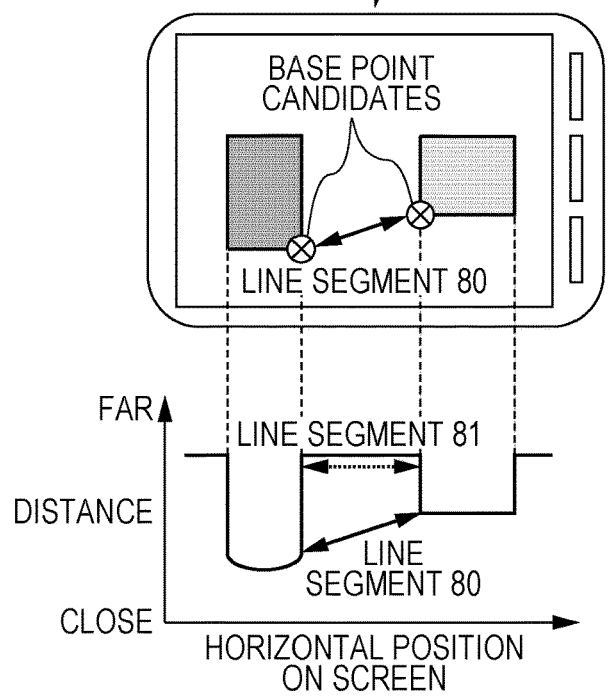

As illustrated in FIG. 7, the body length measurement mode is for a case of measuring the width (line segment 70) of a single object a. As illustrated in FIG. 8, the interval length measurement mode is for a case of measuring the interval (line segment 80) between end points of the object a and an object b.

However, there is a case where the base point candidate that is detected by the above method is incorrectly set in a position not on the object but on a background side. This occurs because in a case where the base point candidates are obtained by the feature point detection, a distinction between the object and the background may not be made with the image information, and the feature point on an edge portion of the object may be contained in the background side. Further, the incorrect setting occurs due to a specification mistake by the user in a case where the specification is performed by the user with the touch panel or the cursor.

An example of the body length measurement mode is a case where a line segment 71 is measured although the user desires to measure the line segment 70 that is illustrated in FIG. 7(B). Further, an example of the interval length measurement mode is a case where a line segment 81 is measured although the user desires to measure the line segment 80 that is illustrated in FIG. 8(B).

In order to avoid those measurement position errors, an automatic determination about the two length measurement modes is made in step S22, and position correction of the base point candidate that is detected in step S21 is performed.

Figure 9:
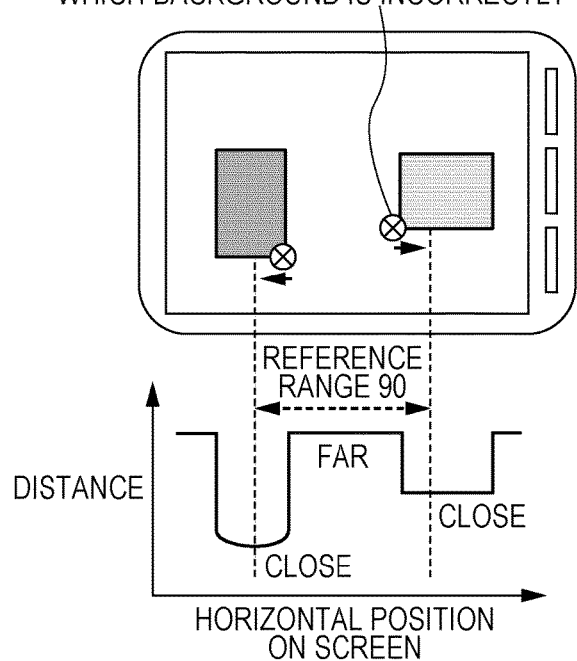
FIG. 9 illustrates an example of reference range setting in a determination of the length measurement mode.

A determination about the length measurement modes is performed by referring to a slope of the distance values and estimating the arrangement relationship between the objects. For example, as illustrated in FIG. 9, a reference range is set on line segments that are extended outside from the position of the base point candidates that are first found, and it may be known that the distance on the line segment changes as "close, far, close" from the left side of the reference range 90. Thus, a determination may be made that the interval length measurement is performed because no body is present inside the reference range 90. On the other hand, in a case where the distance changes as "far, close, far" from the left side of the reference range, a body is present inside the reference range, and a determination may be made that the body length measurement is performed. In this case, determinations of "close" and "far" are made in a case where distance value change of continuous positions is a certain value or greater, that is, a case where the distance value steeply changes in the edge portion of the object or the like. An incorrect determination is thereby avoided in a case where a recess and a protrusion are present on a surface of the single object and other cases. As described above, the coordinates of at least two base points that serve as bases in the length calculation are corrected based on positional dependence of the distance information, and the length between at least two corrected base points may be calculated.

A determination about the length measurement mode is made by the above method, and the positions of the base point candidates are corrected in accordance with the length measurement mode.

In either one of the length measurement modes, the base points need to be not on a body in the background or in the back but on a body that is positioned in the front.

Accordingly, in the body length measurement mode, in a case where a determination is made that the distance of the base point candidate is "far" compared to the distance of the periphery, the base point candidate is moved toward the center of the screen, thereby setting a position on the object in the front as a new base point.

Accordingly, in the interval length measurement mode, in a case where a determination is made that the distance of the base point candidate is "far" compared to the distance of the periphery, the base point candidate is moved in the outward direction of the screen, thereby setting a position on the object in the front as a new base point.

When the base points are determined by the above method, the length measurement unit 15-4 calculates the length between the base points in step S23. Those processes are repeated, and the input-output unit 15-5 finally outputs length information to the display control unit 16.

A three-dimensional position (X, Y, Z) of the base point in a space may be calculated by equations (2) from a two-dimensional position (u, v) of the single base point on the image, the distance Z of the base point, and the focal length f of the image-capturing units.

[Equations 2]

$$\begin{cases} X = Z \times \dfrac{u}{f} \\ Y = Z \times \dfrac{v}{f} \\ Z \end{cases} \quad (2)$$

Given that the three-dimensional positions of the two base points that are calculated by equations (2) are P1(X1, Y1, Z1) and P2(X2, Y2, Z2), a length L between the base points is calculated by equation (3).

[Equation 3]

$$L = \sqrt{(X2-X1)^2 + (Y2-Y1)^2 + (Z2-Z1)^2} \quad (3)$$

As described above, the length measurement device according to this embodiment performs automatic distinction of the body length measurement mode that measures the length of a single body and the interval length measurement mode that measures the interval between two bodies, performs the correction of the positions of the base points in accordance with the length measurement mode of an automatic distinction result, and may thereby measure the length of positions that are desired by the user with high accuracy. Further, the capturing guides are displayed, and the position of the object to be measured is placed along the capturing guides, thereby enabling measurement of the length while an effort in the operation by the user is reduced.

Second Embodiment

In the first embodiment, the length measurement method that performs the automatic distinction of the length measurement modes is described. However, as described below, a similar effect to the first embodiment may be obtained by a method in which the user specifies the length measurement mode.

Figure 10:
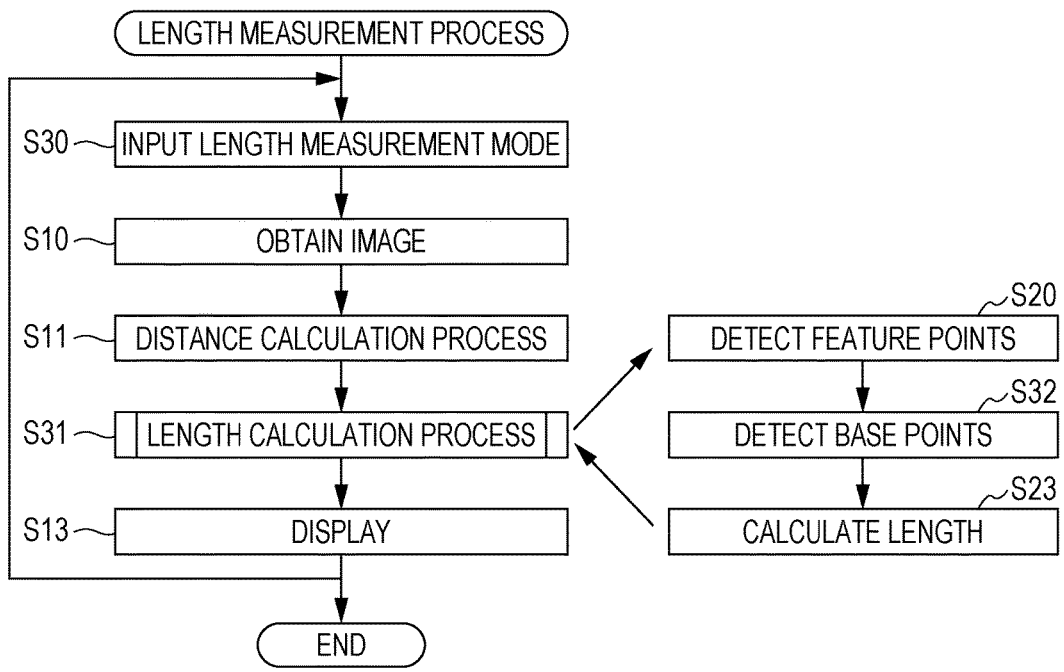
FIG. 10 is a flowchart that illustrates a flow of a length measurement process in the second embodiment of the present invention.

A length measurement device in a second embodiment has the configuration that is illustrated in FIG. 1(A) similarly to the first embodiment. As for processing, the process illustrated in FIG. 10 is performed. In FIG. 10, the same reference characters are provided to the processes that are the same as FIGS. 5 and 6.

A processing method of the length measurement device in this embodiment will hereinafter be described with reference to a flowchart in FIG. 10.

First, when use of the length measurement device is started, the length measurement mode is selected (step S30). As described in the first embodiment, the length measurement modes are the two modes of the body length measurement mode and the interval length measurement mode. A method of selecting the length measurement mode may be performed by a button operation or a touch panel operation.

Next, in step S10 and step S11, the same processes as described in the first embodiment are performed.

Next, a length calculation process of step S31 is performed. In the process in step S31, the base point candidates detection (step S21) and the length measurement mode determination (step S22) in the flowchart illustrated in FIG. 6 are changed to base point detection (step S32). The base point detection in step S32 is a process in which an automatic distinction portion of the length measurement modes is removed from processes of step S21 and step S22 that are described in first embodiment. The configuration in FIG. 1(B) is similarly changed. Thus, in step S32, the base point candidate detection and the correction of the positions of the base point candidates are simultaneously performed based on information of step S30.

In a final step S13, the same process as a content described in the first embodiment is performed.

As described above, because the length measurement mode is specified, the length of desired positions may be measured with high accuracy similarly to the first embodiment while the length measurement mode is clearly known.

Third Embodiment

In the first embodiment or the second embodiment, the distance calculation is performed by the stereo method with the two images of the two image-capturing units 10 and 11. However, as a configuration of a length measurement device 100 illustrated in FIG. 11, either one of the image-capturing units (the second image-capturing unit 11 illustrated in FIG. 1 in a configuration example in FIG. 11) is replaced with a distance measurement unit 101. In this case, an image processing unit 102 in FIG. 11 has a configuration in which a distance calculation unit 14 is removed from the image processing unit 12 illustrated in FIG. 1, and distance information that is output from the distance measurement unit 101 is directly input to a length calculation unit 15. The same reference numerals are provided to units in the same configuration in FIG. 1 and FIG. 11.

Figure 11:
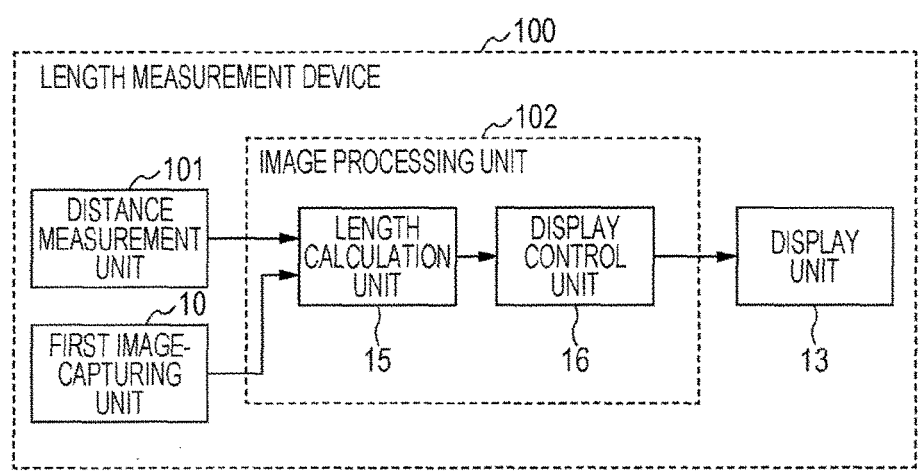
FIG. 11 is a function block diagram that illustrates a configuration example of a length measurement device in a third embodiment of the present invention.

The configuration in FIG. 11 may provide a similar effect to the first embodiment by a similar processing method to the flowchart in FIG. 5. However, a distance calculation process in step S11 is a distance obtainment process by the distance measurement unit 101 and is simultaneously performed with image obtainment in step S10.

The distance measurement unit 101 may use a method that uses infrared rays and is represented by a time of flight (TOF) method or may use any method that enables obtainment of the distance information.

In the TOF method, invisible light such as infrared rays is irradiated from a light source such as a light emitting diode (LED), the time of flight in which the light reaches the object or the like and reflected light returns is measured, thereby measuring the distance. The time of flight is measured for each of finely divided areas, and the distance measurement of not only a single point but also various portions of the object is enabled. As methods of measuring the time of flight, there are a method in which pulse irradiation of a laser beam is performed and a time in which a pulse is emitted and reflected light returns is measured, a method in which irradiated infrared rays are modulated and the time of flight is calculated from phase difference between a phase at the irradiation and a phase of reflected light, and so forth.

As described in the above three embodiments, in the length measurement device of the present invention, the distance information is calculated from the image information that is captured by the at least two image-capturing units or obtained by the distance measurement unit, a positional relationship of the captured image is recognized based on the obtained distance information, the positions of the at least two base points that serve as the bases in the length calculation are corrected based on the positional relationship of the object, and the length between the corrected base points is calculated, thereby enabling the measurement of the length of the positions desired by the user with high accuracy.

In the above embodiments, in order to facilitate understanding of the descriptions, the length measurement mode is categorized as the body length measurement mode and the interval length measurement mode, and the distinction of the length measurement mode is thereby performed. However, it is not necessarily needed that the distinction is performed with those two modes. For example, in a case where the width of a paned window is measured, it is difficult to obtain the distance information of the paned window itself. The distance information of the distance beyond the paned window is obtained, and a paned window portion is determined as the background. The length measurement is distinguished not as the length measurement of the width of a body but as the length measurement of the interval between two bodies. However, because measurement of the interval from a window frame to a window frame is equivalent to measurement of the width of the paned window, the distinction of the length measurement mode does not have to be performed as described above.

Further, the capturing guides are displayed on the display unit, and the length measurement is performed while the position of the object is placed along the capturing guides, thereby allowing the user to perform the length measurement by an operation with a lighter effort. Further, enlarged displays of areas of the capturing guides are then performed, thereby facilitating the position matching of the object.

Further, the above descriptions are made with an example where the length measurement device of the present invention is implemented in an information terminal such as a smart phone. However, the present invention is not limited to this, but a similar effect may be obtained by using a device that includes an image-capturing unit such as a digital camera.

Fourth Embodiment

A fourth embodiment of the present invention will hereinafter be described in detail with reference to drawings. Representation in the drawings is emphasized to facilitate understanding and may be different from reality.

Figure 12:
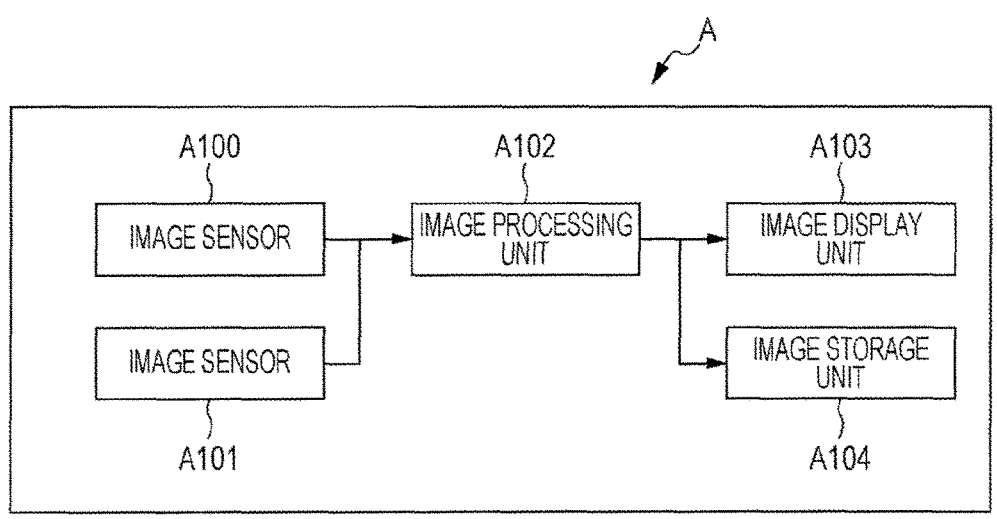
FIG. 12 is a function block diagram that illustrates a configuration example of an image capturing device according to an embodiment of the present invention.

FIG. 12 is a function block diagram that illustrates a configuration example of an image capturing device of an embodiment of the present invention. An image capturing device A of this embodiment includes at least two image sensors of a first image sensor A100 and a second image sensor A101. Images that are captured by the two image sensors A100 and A101 is transmitted to an image processing unit A102. After a necessary image processing is performed, the images are transmitted to an image display unit A103. The images may be displayed on a display, and image data may be saved in an image storage unit A104.

In this embodiment, although a description is made referring only to the image sensor instead of the image-capturing unit, the image-capturing unit and the image sensor are considered to be equivalent in terms of obtainment of image information. That is, a configuration of a device that includes the image sensor includes an optical system and so forth that are not illustrated in the description or the drawings, and the image sensor is used in the description on the assumption that the image sensor obtains the image information similarly to the image-capturing unit. Further, the image display unit in this embodiment is equivalent to the display unit in the above embodiments and displays image information on which image processing is performed by the image processing unit.

The image sensors A100 and A101 are configured with optical components such as lenses, sensors that obtain image data by photoelectric conversion, and so forth. Solid-state image sensors such as a complementary metal oxide semiconductor (CMOS) and a charge coupled device (CCD) may be used for the sensor, for example. In the image processing unit A102, processing is performed by hardware processing by a field programmable gate array (FPGA) or the like, software processing by a processor such as a central processing unit (CPU), or the like. The image display unit A103 may be configured with a display device such as a liquid crystal display or an organic EL panel, for example. The image storage unit A104 may be configured with a storage medium such as a flash memory or a hard disk, for example.

Figure 13:
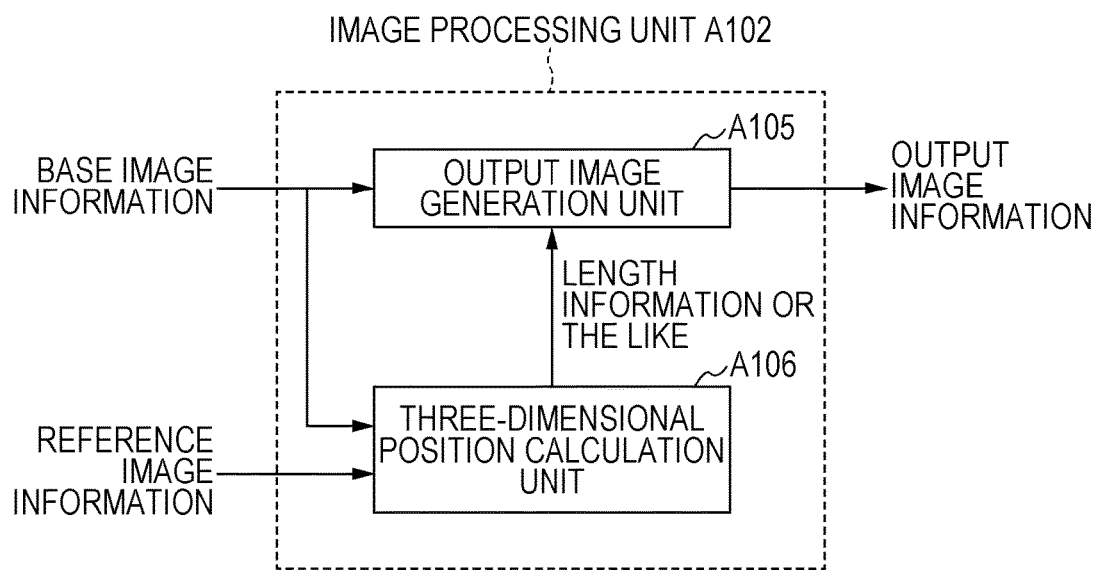
FIG. 13 is a function block diagram that illustrates a configuration example of an image processing unit of the image capturing device according to this embodiment.

FIG. 13 is a function block diagram that illustrates a configuration example of the image processing unit A102 of the present invention. The image processing unit A102 has an output image generation unit A105 and a three-dimensional position calculation unit A106. Base image information is either one of pieces of the image information that are captured by the first image sensor A100 and the second image sensor A101. Reference image information is the image information that is not the base image information that is captured by the first image sensor A100 or the second image sensor A101. In this embodiment, a description is made on the assumption that the image captured by the left image sensor when the image capturing device A faces the object serves as the base image information. The base image information is input to the output image generation unit A105. Basic image processing such as color conversion, sharpening, noise reduction, and contrast correction is performed, and necessary information from length information that is calculated by the three-dimensional position calculation unit A106 and so forth is added to the image information. The image information is then output as output image information.

Figure 14:
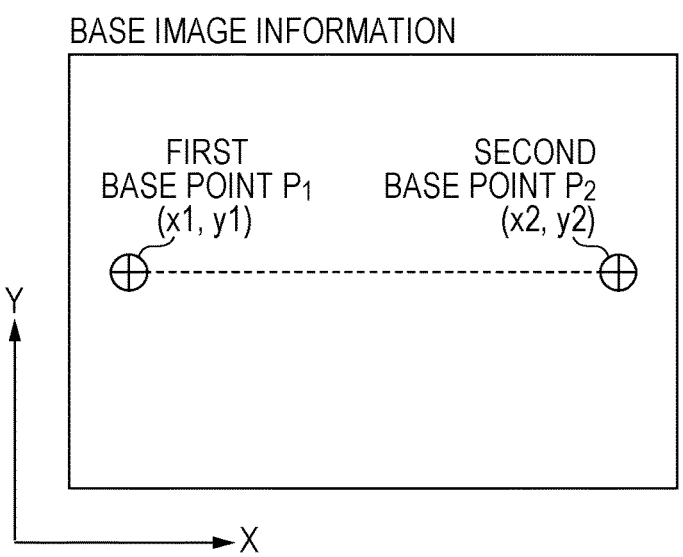
FIG. 14 illustrates a first base point and a second base point.

The three-dimensional position calculation unit A106 calculates three-dimensional positions of a first base point and a second base point in the base image information and calculates the length between the two points based on the principle of triangulation. As illustrated in FIG. 14, the first base point and the second base point are two points that are set in the base image information or the output image information and are set to be separated by prescribed coordinates. Considering a process in calculating the distance between the two points, the two base points are preferably arranged in horizontal or perpendicular positions. That is, when the first base point P1(x1, y1) and the second base point P2(x2, y2) are given, the points are separately arranged in horizontal positions as FIG. 14, and thus y1=y2.

The distances to the object at the first base point and the second base point are calculated with the disparity that occurs between the base image information and the reference image information.

Figure 15:
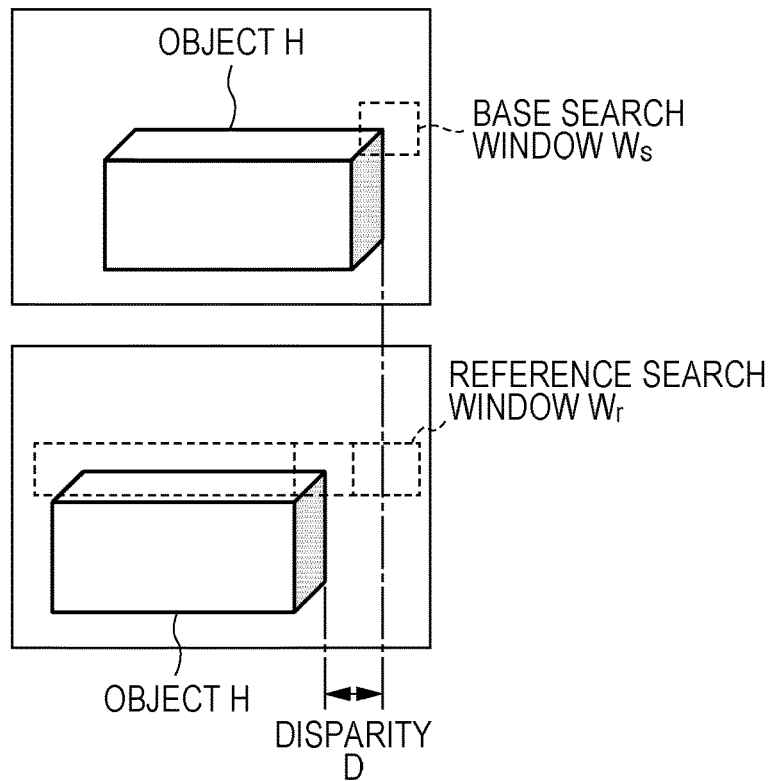
FIG. 15 illustrates a search process by block matching.

As illustrated in FIG. 15, the disparity D may be calculated by block matching in which the pixel information that contains peripheries of the base points is set as a base search window Ws and moves in a reference search window Wr that is set in the reference image information. The block matching is performed by evaluating a degree of similarity or a degree of difference by the sum of absolute difference (SAD), the sum of squared difference (SSD), or the like, for example. The distance may be calculated from the calculated disparity D, and the distance Z is calculated by $Z=B \times f/D$. Here, B is a baseline length between the two image sensors, and f is a focal length of the two image sensors. The distance is calculated, and a relative distance from base coordinates in X direction and Y direction may thereby be calculated. That is, the distance between the two points may be calculated from the coordinate positions of the first base point and the second base point.

The length information that is calculated by the three-dimensional position calculation unit A106 is transmitted to the output image generation unit A105, added to the base image information, and output as the output image information.

Figure 16:
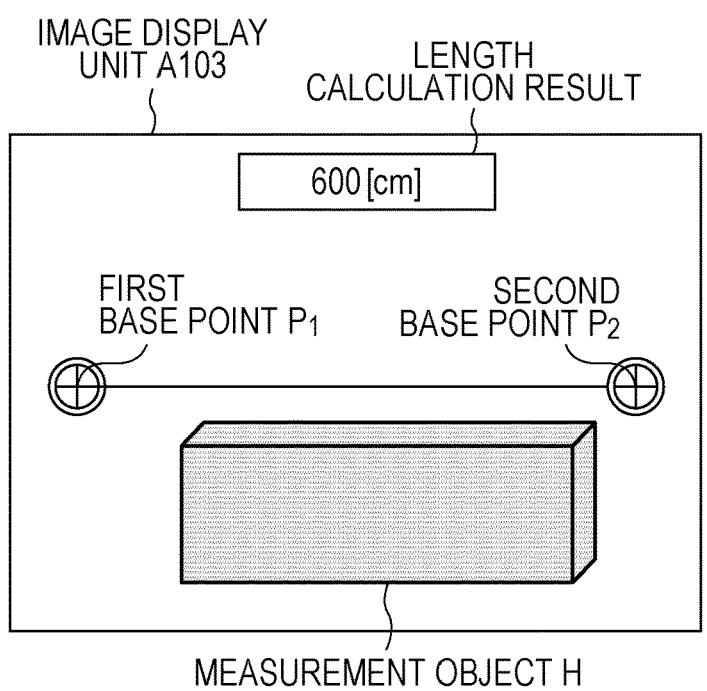
FIG. 16 illustrates a display example on an image display unit of the image capturing device according to this embodiment.

FIG. 16 illustrates a state where the output image information is displayed on the image display unit A103. The calculated length information (length calculation result) is displayed in an upper portion of the screen together with a measurement object H while being superposed on an image that is being captured by the image sensors. Further, the first base point P1 and the second base point P2, the length between which is calculated by the three-dimensional position calculation unit A106, are also superposed on the base image information.

Figure 17:
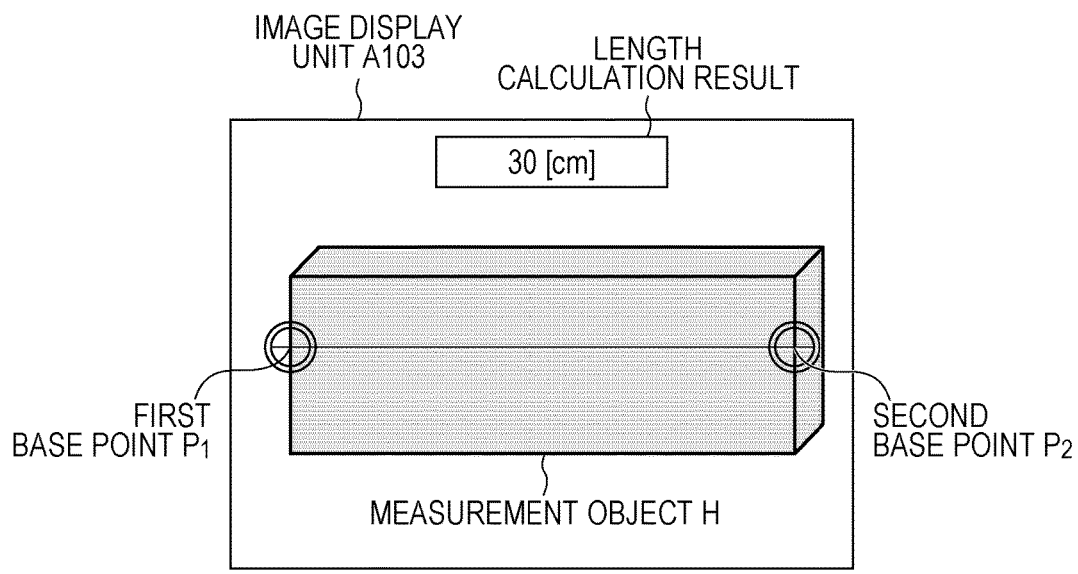
FIG. 17 illustrates a display example on the image display unit of the image capturing device according to this embodiment.

As illustrated in FIG. 17, measurement between desired two points is performed by matching the first base point P1 and the second base point P2 with desired two points to be measured. Then, the first base point P1 and the second base point P2 for calculating the length are always displayed and may be matched with a measurement object without touch, pointing, or the like, and the two points may thereby be easily specified with high accuracy.

Further, the first base point P1 and the second base point P2 for calculating the length are set, and the distance between the two points may thus be always calculated. Accordingly, the first base point P1 and the second base point P2 are matched with the measurement object while whether or not measurement of the length between the desired two points is achieved is checked. The accuracy of the position matching may thereby be increased, and failure of the measurement may be avoided. For example, in FIG. 17, in a case where the first base point P1 is slightly offset to the left from the measurement object, the first base point P1 becomes the background, and the length from the second base point P2 becomes very long. This calculation result is displayed on the image display unit A103 as the length calculation result. That is, a large difference in value facilitates a prediction of an offset position of the base point. Thus, the base point may then be matched with the measurement object again, and failure of the measurement may thereby be avoided.

Figure 18:
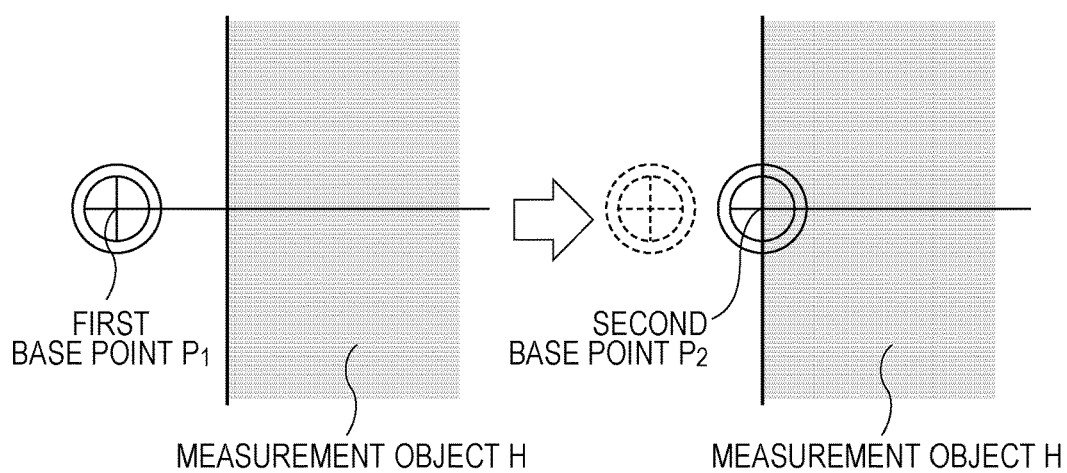
FIG. 18 illustrates the relationship between the first base point and a measurement object.

In addition, the desired point to be measured is often the feature point of the measurement object. A feature point is a point at which a change occurs on the image information such as an outline or a pattern of the object. Thus, setting is made so that the first base point P1 and the second base point P2 are likely to be set to the feature points of the base image information. As illustrated in FIG. 18, setting is made so that the feature point of the measurement object H is set as the first base point P1 when the first base point P1 approaches the measurement object H. The feature points may be calculated with differential values or secondary differential values of the target pixel and peripheral pixels in the base image information. When the distance between the first base point P1 and the second base point P2 is calculated, coordinates that result from fine adjustment of positions are used. This facilitates setting of the point for which the measurement of the length is desired and enables the measurement of the distance with high accuracy.

Figure 19:
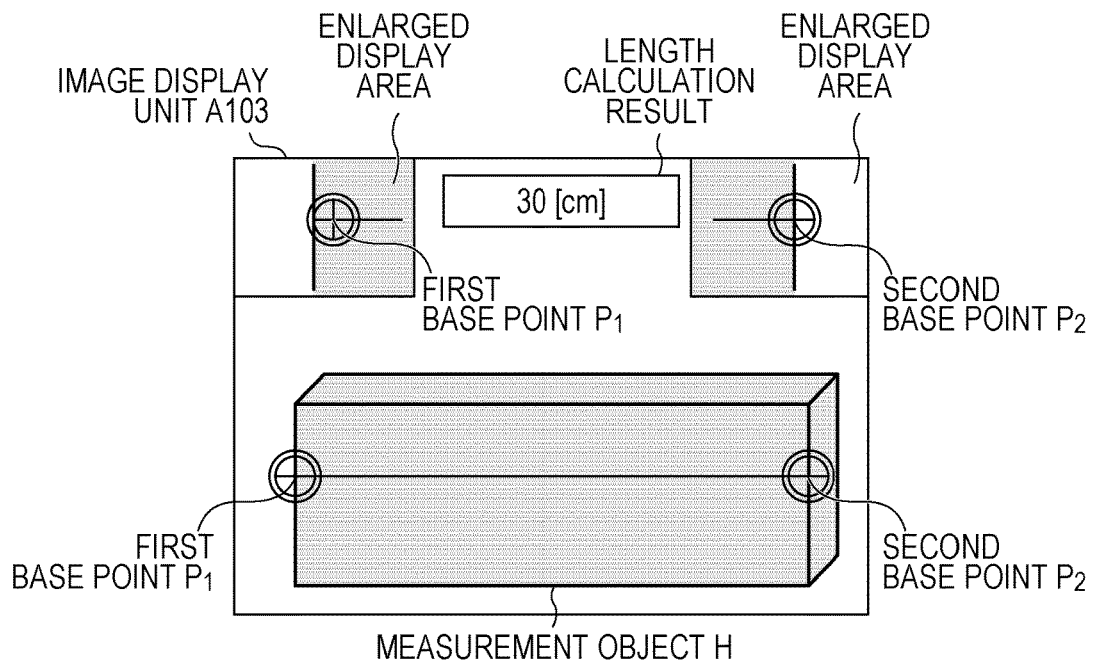
FIG. 19 illustrates a display example on the image display unit of the image capturing device according to this embodiment.

Further, as illustrated in FIG. 19, it is preferable to perform enlarged displays of peripheral areas of the first base point P1 and the second base point P2 and set the base points with high accuracy. This is particularly effective in a case where resolution of the image information that is captured by the image sensors is high. Even in a case where the resolution of the image information that may be captured by the image sensors is high, if resolution of the image display unit is low, the base points are set with the resolution of the image display unit, resulting in unclear setting of the base points. Accordingly, the enlarged displays are performed to obtain as high resolution as the resolution of the capturing to facilitate fine setting of the base points, and the measurement of the length may thereby be performed with high accuracy.

On the other hand, in a case where it is desired to measure the length of a portion of a capturing target, only the portion of the capturing target is displayed on the image display unit A103. In this case, it may be difficult to recognize which portion of the capturing target is captured. Accordingly, it is preferable that a cut-out image of the entire image is displayed in an area for a normal display in FIG. 19, areas that are enlarged display areas serve as reduced image areas in which the entire capturing target is displayed, and the entire capturing target may be recognized. Those display methods may arbitrarily set by the user.

In the above, a description is made about a case the image display unit A103 is laterally long and the first base point P1 and the second base point P2 are arranged in the horizontal direction. However, the processing may similarly be carried out in other arrangement and relationships.

Figure 20:
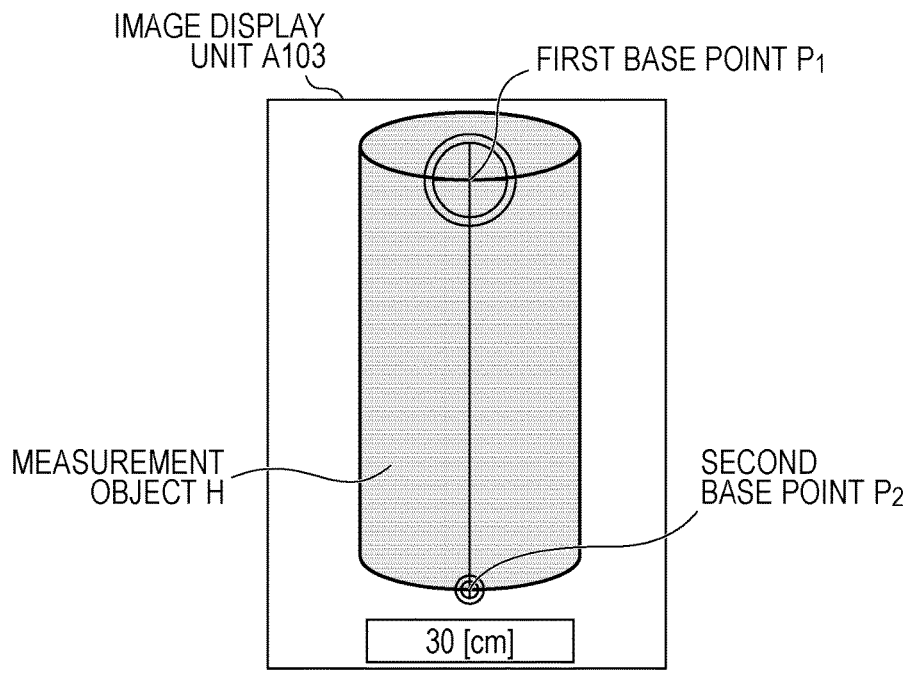
FIG. 20 illustrates a display example on the image display unit of the image capturing device according to this embodiment.
Figure 21:
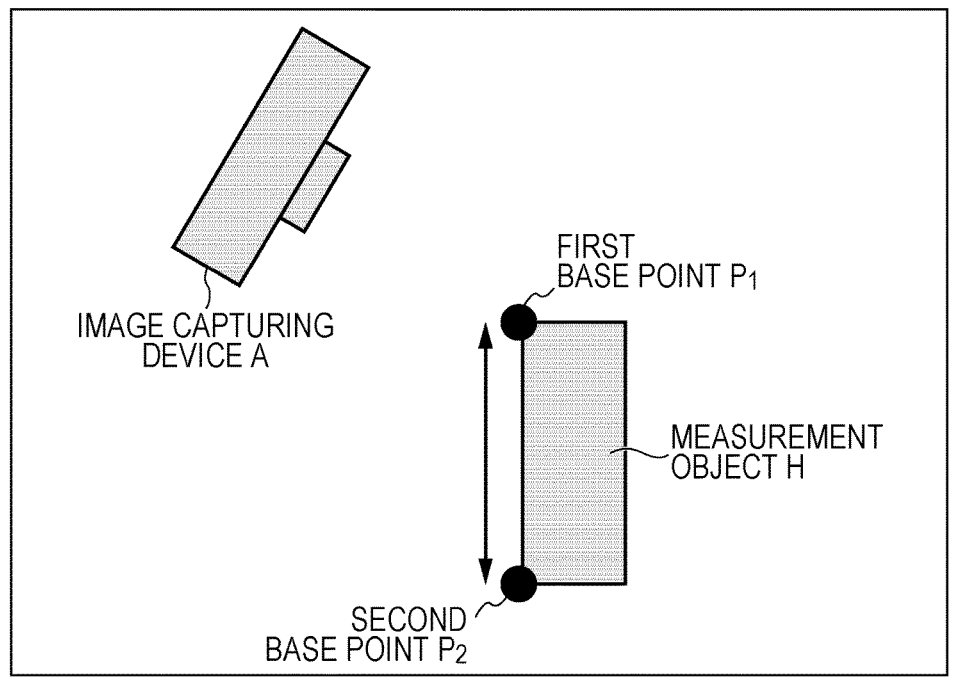
FIG. 21 illustrates the relationship between the image capturing device and the measurement object.

FIG. 20 illustrates a case where the image display unit A103 is vertically long and the first base point P1 and the second base point P2 are in the vertical direction. Further, in FIG. 20, the first base point P1 and the second base point P2 are displayed in different sizes. This is because sizes are made different in accordance with the distances to the object at the base points. When the image display unit A103 is in a state as FIG. 20, the relationship between the image capturing device A and the measurement object is as FIG. 21. The distance from the image capturing device A to the second base point P2 is long compared to the distance from the image capturing device A to the first base point P1. This results in the size difference between the base points on the image display unit A103.

In general, the disparity and the distance are in an inversely proportional relationship. When the disparity is calculated as a discrete value, fine calculation is performed for a near view, and rough calculation is performed for a distant view. This indicates that when the distance between the two points is calculated, influence of an error of one of the first base point P1 and the second base point P2 that provides a longer distance to the object H is large. Thus, in order to calculate the distances for the first base point P1 and the second base point P2 with almost the same magnitudes of accuracy, the distances between the base points and the image capturing device A are preferably almost the same distances. In a state of FIG. 20, although the disparity for the first base point P1 is finely calculated, the disparity for the second base point P2 contains many errors. Thus, an error of the calculated length contains at least an error of the second base point P2.

Accordingly, information about the distances to the object H at the base points is displayed on the image display unit A103 as FIG. 20, a guidance may thereby be made so that the distances between the image capturing device A and the base points become almost the same. The three-dimensional position calculation unit A106 transmits to the output image generation unit A105 distance information for the base points or disparity information in addition to the length information, and the output image information is generated.

Figure 22:
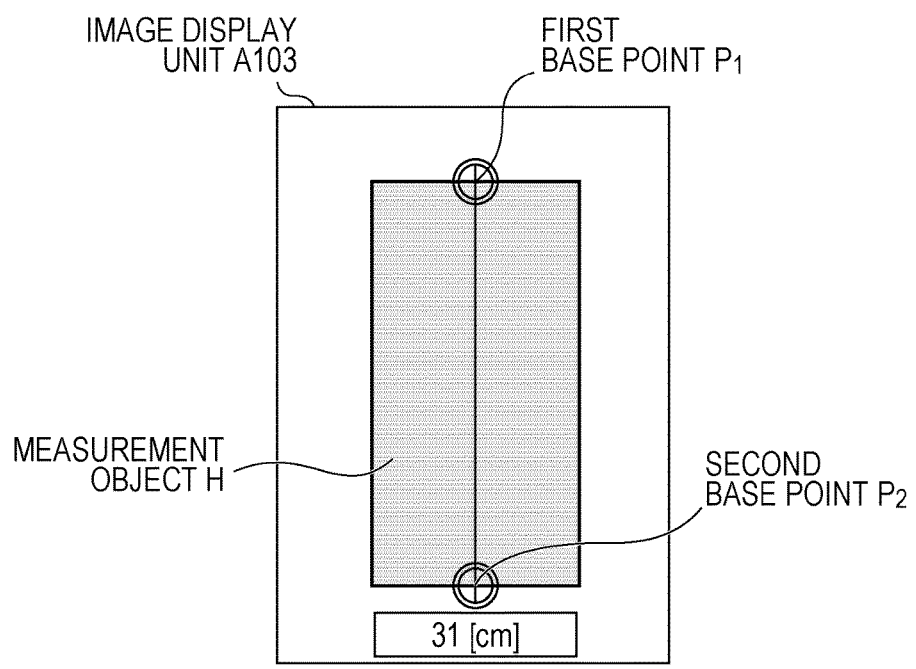
FIG. 22 illustrates a display example on the image display unit of the image capturing device according to this embodiment.
Figure 23:
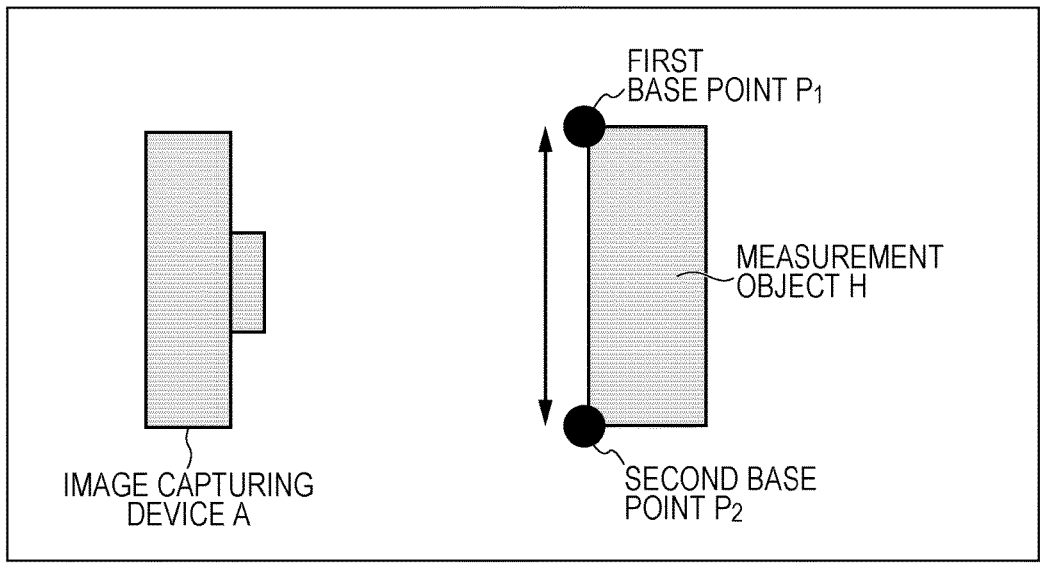
FIG. 23 illustrates the relationship between the image capturing device and the measurement object.

FIG. 22 illustrates a state that results from adjustment to make the sizes of the displayed base points the same. The sizes of the displayed base points are almost the same, and both of the base points are closer to the image capturing device A than the second base point P2 in FIG. 20. It is expected that the disparity is calculated with almost the same magnitudes of resolution. Thus, the error of the calculated length is an error of at least both of the base points, and the length is calculated with higher accuracy than a case of FIG. 20. When a display state of the image display unit A103 is a state as FIG. 22, the relationship between the image capturing device A and the measurement object is as FIG. 23. In this state, the image capturing device A captures images of the measurement object H from the front, and proper measurement of the distance is enabled.

In addition, in a case where a captured image is saved in the image storage unit A104, the captured image may be saved when a signal for capturing the image is received, or the captured image may be saved when the disparity values of the first base point P1 and the second base point P2 become approximately the same. It is preferable to save the captured image when the disparity values of the first base point P1 and the second base point P2 become approximately the same after the signal for capturing the image is received because the length that is expected by a capturing person may be measured and saved.

Here, in this embodiment, the sizes of the first base point P1 and the second base point P2 that are displayed represent the distances between the image capturing device A and the base points. However, representation may be performed by hue, saturation, or brightness of a point that represents the base point, and other methods may provide a similar effect. For example, the base point that is far from the image capturing device A is colored in blue, the base point that is close to the image capturing device A is colored in red, and the base points are made colorless as their distances approach to each other. However, a method in which the base point is displayed in a large size in a case where the distance to the object H is short and the base point is displayed in a small size in a case where the distance to the object H is long uses perspective as representation of being close or far, thus facilitates understanding by the user, and is preferable for representing the distances for the base points.

Figure 24:
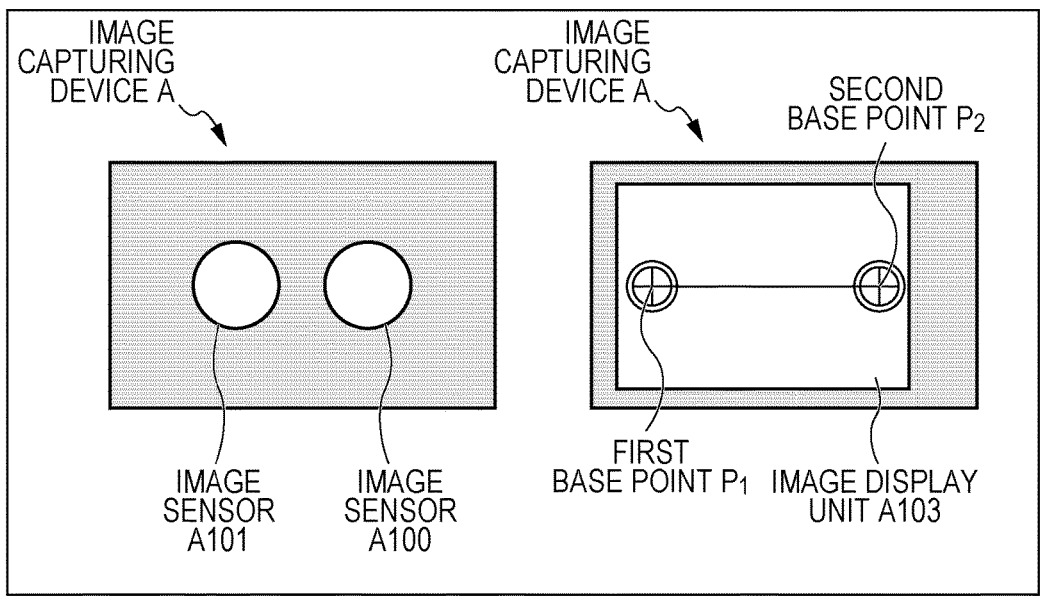
FIG. 24 illustrates the relationship between arrangement of image sensors of the image capturing device according to this embodiment and arrangement of the base points.

FIG. 24 illustrates the relationship between arrangement of the two image sensors A100 and A101 that are included in the image capturing device of this embodiment and the first base point P1 and the second base point P2 that are displayed on the image display unit A103. The disparity occurs in a direction in which the image sensors are arranged between the pieces of image information that are captured by the two image sensors that are arranged in parallel. Thus, in a case where disparity calculation is performed by the block matching or the like by using the feature points, the feature points that have an outline directed differently from the direction in which the image sensors are arranged may reduce incorrect calculation.

For example, in a case where an outline in the same direction as the direction in which the image sensors are arranged is the feature points, when the block matching in the left-right direction is performed, it may be possible that a plurality of reference search windows that are similar to a base search window are present because the outline is provided in the left-right direction. On the other hand, in a case where the outline in the different direction as the direction in which the image sensors are arranged is the feature points, only one reference search window in which the outline is present in a search in the left-right direction is present.

Here, in a case where a length in the left-right direction is measured on the image display unit A103, the feature points in the first base point P1 and the second base point P2 are often an outline in the up-down direction. Thus, the disparity occurs in the left-right direction. When the search of the block matching is performed in the left-right direction, the accuracy of the disparity calculation with the feature points is improved. In order to realize this, it is necessary that the two image sensors are arranged in the left-right direction for the above-described reason. That is, as illustrated in FIG. 24, the direction in which the two image sensors are arranged is matched with the direction in which the two base points are arranged, the accuracy of the disparity calculation with the feature points in the base points in the measurement of the length is thereby improved, and the accuracy of a calculation result of the measured length may be improved.

Figure 25:
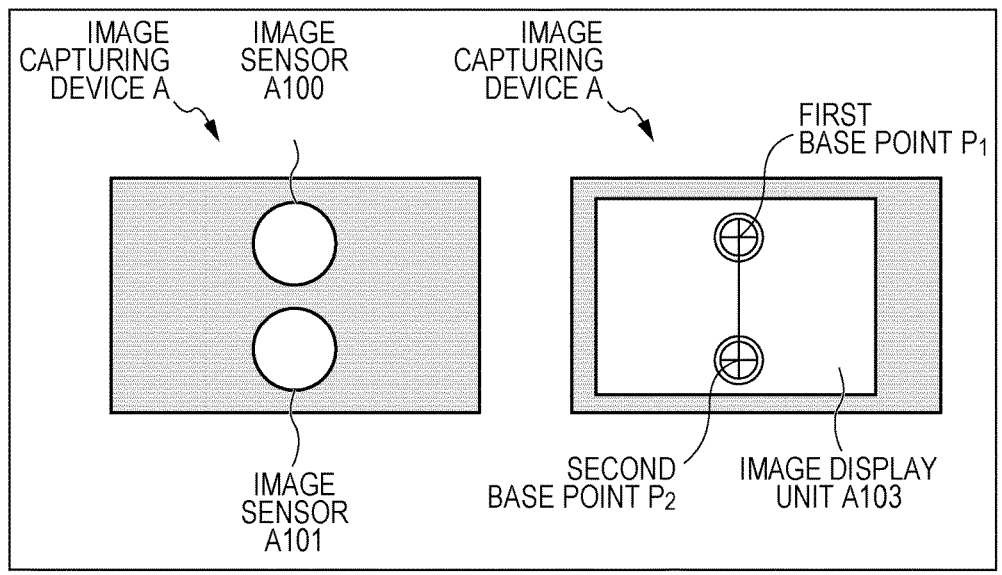
FIG. 25 illustrates the relationship between arrangement of the image sensors of the image capturing device according to this embodiment and arrangement of the base points.
Figure 26:
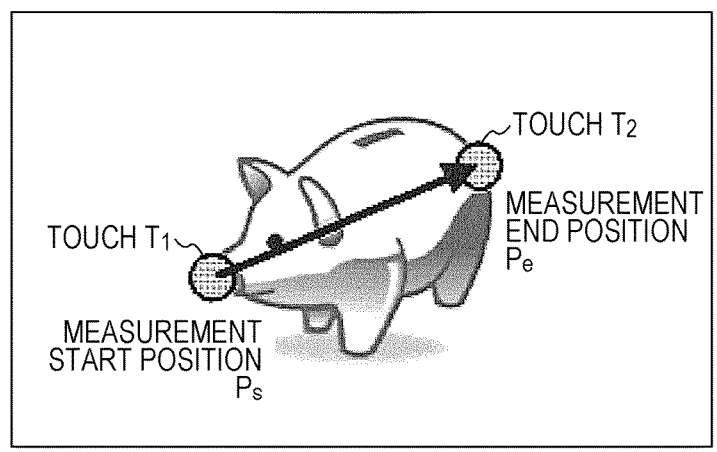
FIG. 26 illustrates a technique in related art.

A state of FIG. 25 is also the state where the direction in which the two image sensors are arranged is matched with the direction in which the two base points are arranged, other than FIG. 24. The image capturing device in either one of the drawings may provide a similar effect. Rotating the image capturing device enables measurement of a length in either one of the up-down direction and the left-right direction. However, in a case where images of the measurement object between two points that are desired for the measurement is captured in large sizes and the base points are set, the length may be measured with higher accuracy. Accordingly, it is preferable to arrange the two image sensors and the two base points in the longitudinal direction of the image display unit as FIG. 24. In addition, for a similar reason, it is preferable in terms of the accuracy of the measured length that the two base points that are displayed on the image display unit A103 are separately set in at least half the distance of the width of the image display unit A103 in the direction in which the two base points are arranged.

A result of the capturing or measurement by the image capturing device may be stored in the image storage unit A104. The image information that is stored may be image information that contains the first base point, the second base point, and the length measurement result in a state where those are displayed on the image display unit A103, image information in which meta data of the base image information contain the first base point, the second base point, and the length calculation result, or both of image information that contains the first base point, the second base point, and the length calculation result and the base image information. It is preferable that the user may appropriately perform setting.

As described above, the image capturing device of the present invention captures images while displaying the two base points for the measurement of the length, thereby facilitating setting of the base points in desired positions and enabling an improvement in the accuracy of the calculation result of the desired length. Further, because the base points are set, the disparity may always be calculated, and a length measurement result in a capturing state may thereby be displayed. Failure of the measurement may be avoided by checking whether or not the measurement of the desired length is achieved. Further, the distance information for the base points is displayed by calculating the disparity, the relationship between the image capturing device and the measurement object may thereby be recognized, and a guidance may be made to the capturing state with high accuracy. Further, in a case where the image information is saved when the disparity values become approximately the same, the image information may be saved in the capturing state with high accuracy.

In addition, fine adjustment is automatically performed so that the base points are likely set to the feature points of the base image information, thereby enabling easy measurement of the desired length. Further, enlarged images around the base points are displayed and an image of the entire measurement object is displayed in addition to the capturing state of the measurement object, and the base points may thereby be easily set with high accuracy.

In addition, the direction in which the two image sensors are arranged is matched with the direction in which the two base points are arranged, incorrect calculation of the disparity may thereby be reduced, and incorrect calculation of the measured length may be reduced. Further, because the accuracy of the length calculation may be improved in a case where an image of the measurement object is captured in a large size, it is preferable to separately set the first base point and the second base point in at least half the width of the image display unit in the direction in which both of the base points are arranged.

In this embodiment, a description is made focusing on only a function of image capturing of the image capturing device. However, a cellular phone or a portable information terminal that includes two image sensors may provide a similar effect. Further, a description is made about a case where the base point is a circle, but other shapes such as a rectangle may provide a similar effect.

In the above embodiments, the configurations and so forth illustrated in the attached drawings are not limited to those but may appropriately be modified within the scope where the effects of the present invention may be obtained. In addition, the present invention may be practiced with appropriate modifications without departing from the object of the present invention.

Further, the elements of the present invention may arbitrarily be selected, and inventions that include the selected configurations are included in the present invention.

Further, a program for realizing functions that are described in the embodiments is recorded in a computer-readable recording medium, the program that is recorded in the recording medium is read and executed by a computer system, and a process of each unit may thereby be performed. It should be noted that the "computer system" herein includes an OS and hardware such as peripheral devices.

Further, the "computer system" includes a homepage providing environment (or display environment) in a case where the World Wide Web (WWW) system is used.

Further, "computer-readable recording media" are portable media such as flexible disks, magneto-optical disks, ROMs, and CD-ROMs and storage devices such as hard disks that are built in the computer system. In addition, the "computer readable recording media" include elements that dynamically retain the program for a short period of time like communication wires in a case where the program is transmitted via a communication line such as a network like the internet and a telephone line and elements that retain the program for a certain period such as volatile memories in the computer systems that are servers or clients in the above case. Further, the program may realize a portion of the above-described functions and may be realized in combination with a program where the above-described functions are already recorded in the computer system. At least a portion of the functions may be realized by hardware such as an integrated circuit.

INDUSTRIAL APPLICABILITY

The present invention is applicable to a length measurement device. Further, the present invention is applicable to an image capturing device.

REFERENCE SIGNS LIST

1 length measurement device
10 first image-capturing unit
11 second image-capturing unit
12 image processing unit
13 display unit
14 distance calculation unit
15 length calculation unit
15-1 feature point detection unit
15-2 base point candidate detection unit
15-3 length measurement mode determination unit 15-4 length measurement unit
15-5 input-output unit
16 display control unit
20 object
30 capturing guide frame
31 capturing guide frame
32 length measurement position
33 display area
34 display area
35 button
70 line segment
71 line segment
80 line segment
81 line segment
90 reference range
100 length measurement device
101 distance measurement unit
102 image processing unit
A image capturing device
A100 image sensor
A101 image sensor
A102 image processing unit
A103 image display unit
A104 image storage unit
A105 output image generation unit
A106 three-dimensional position calculation unit

The invention claimed is:

1. An image capturing device comprising:
at least two image sensors;
image processing circuitry that performs image processing on image information that is captured by the image sensors; and
a display device that displays the image information on which the image processing is performed by the image processing circuitry, wherein
the image processing circuitry displays two base points so that the two base points are superposed on a single captured image on the display device in a same direction as a direction in which the two image sensors are separated, calculates, on a basis of the image information captured by the two image sensors, a length between a first base point and a second base point that are the two base points, and displays a result of the calculation of the length between the first base point and the second base point on the display device, and
an imaginary straight line that connects the two image sensors is parallel to an imaginary straight line that connects the two base points.

2. The image capturing device according to claim 1, wherein the image processing circuitry corrects coordinate positions of the two base points based on positional dependence of distance information that corresponds to the image information and calculates a length between the corrected two base points.

3. The image capturing device according to claim 1, wherein feature point is detected from the image information, and the coordinate position is adjusted such that at least one of the two base points is set to the feature point.

4. The image capturing device according to claim 2, wherein feature point is detected from the image information, and the coordinate position is adjusted such that at least one of the two base points is set to the feature point.

5. The image capturing device according to claim 1, wherein a display format of at least one of the two base points is changed in accordance with the distance information.

6. The image capturing device according to claim 2, wherein a display format of at least one of the two base points is changed in accordance with the distance information.

7. The image capturing device according to claim 3, wherein a display format of at least one of the two base points is changed in accordance with the distance information.

8. An image processing method that uses an image capturing device that includes at least two image sensors, image processing circuitry that performs image processing on image information that is captured by the image sensors, and a display device that displays the image information on which the image processing is performed by the image processing circuitry, the method comprising using the image processing circuitry to perform:
a step of displaying two base points so that the two base points are superposed on a single captured image on the display device in a same direction as a direction in which the two image sensors are separated;
a step of calculating, on a basis of the image information captured by the two image sensors, a length between a first base point and a second base point that are the two base points; and
a step of displaying a result of the calculation of the length between the first base point and the second base point on the display device, wherein
an imaginary straight line that connects the two image sensors is parallel to an imaginary straight line that connects the two base points.

9. A non-transitory computer-readable recording medium on which is recorded a program that executes the image processing method according to claim 8.

10. The image capturing device according to claim 1, wherein the image processing circuitry calculates a feature point based on the image information and a coordinate position is adjusted such that the first base point or the second base point is set to the feature point when the first base point or the second base point approaches the feature point.

11. The image capturing device according to claim 1, further comprising an image storage memory in which a captured image is saved in a case where disparity values of the respective two base points are the same.

12. The image capturing device according to claim 1, wherein
the image processing circuitry operates in one of (i) a body length measurement mode that measures a length or a width of a single body, or (ii) an interval length measurement mode that measures an interval between two bodies; and
the image processing circuitry corrects coordinate positions of the respective two base points in accordance with a corresponding one of the body length measurement mode and the interval length measurement mode.

13. The image capturing device according to claim 5, wherein the display format is selected from a group consisting of a size, a hue, a saturation, and a brightness of the at least one of the two base points.

14. The image capturing device according to claim 1, wherein the display device (i) enlarges and displays peripheral areas of the two base points in the single captured image or (ii) displays an entire capturing target.

15. The image capturing device according to claim 1, wherein the image processing circuitry calculates a disparity value of the first base point and a disparity value of the second base point, the respective disparity values of the first base point and the second base point being used for the calculation of the length between the first base point and the second base point.

16. The image processing method according to claim 8, wherein the method further comprises using the image processing circuitry to perform:
   a step of calculating a disparity value of the first base point and a disparity value of the second base point, the respective disparity values of the first base point and the second base point being used for the calculation of the length between the first base point and the second base point.

17. The image capturing device according to claim 1, wherein the first base point and the second base point are each a point set by the image capturing device or a fixed point.

18. The image processing method according to claim 8, wherein the first base point and the second base point are each a point set by the image capturing device or a fixed point.

19. The image capturing device according to claim 1, wherein the first base point and the second base point on the display device are separated from each other by at least a distance of half a length of the single captured image in the direction in which the first base point and the second base point are arranged.

20. The image capturing device according to claim 8, wherein the first base point and the second base point on the display device are separated from each other by at least a distance of half a length of the single captured image in the direction in which the first base point and the second base point are arranged.

* * * * *